United States Patent
Ye et al.

(10) Patent No.: US 11,581,731 B2
(45) Date of Patent: Feb. 14, 2023

(54) TEST AND CONTROL APPARATUS, SYSTEM AND METHOD FOR WIND FARM

(71) Applicant: BEIJING GOLDWIND SCIENCE & CREATION WINDPOWER EQUIPMENT CO., LTD., Beijing (CN)

(72) Inventors: Nan Ye, Beijing (CN); Yi Zhang, Beijing (CN); Yuan Qiao, Beijing (CN)

(73) Assignee: Beijing Goldwind Sciene & Creation Windpower Equipment Co., Ltd., Beijing (CN)

( * ) Notice: Subject to any disclaimer, the term of this patent is extended or adjusted under 35 U.S.C. 154(b) by 903 days.

(21) Appl. No.: 15/778,916

(22) PCT Filed: Jun. 28, 2017

(86) PCT No.: PCT/CN2017/090542
§ 371 (c)(1),
(2) Date: May 24, 2018

(87) PCT Pub. No.: WO2018/120694
PCT Pub. Date: Jul. 5, 2018

(65) Prior Publication Data
US 2021/0079888 A1    Mar. 18, 2021

(30) Foreign Application Priority Data
Dec. 26, 2016 (CN) .......................... 201611217583.9

(51) Int. Cl.
*H02J 3/38* (2006.01)
*H02J 3/46* (2006.01)
(Continued)

(52) U.S. Cl.
CPC ............ *H02J 3/001* (2020.01); *F03D 7/0284* (2013.01); *F03D 7/048* (2013.01); *F03D 17/00* (2016.05);
(Continued)

(58) Field of Classification Search
CPC ........ F03D 7/0284; F03D 7/048; F03D 17/00; F03D 7/00; H02J 3/32; H02J 3/466;
(Continued)

(56) References Cited

U.S. PATENT DOCUMENTS 7,608,937 B1 * 10/2009 Altenschulte ........... H02J 3/386
290/44
9,077,204 B2 * 7/2015 More ........................ F03D 7/00
(Continued)

FOREIGN PATENT DOCUMENTS

CN    101794997 A    8/2010
CN    102510092 A    6/2012
(Continued)

OTHER PUBLICATIONS

The Authoritative Dictionary of IEEE Standards and Terms, Seventh Ed., publ. 2000, p. 460.*
(Continued)

*Primary Examiner* — M. N. Von Buhr
(74) *Attorney, Agent, or Firm* — Finnegan, Henderson, Farabow, Garrett & Dunner, LLP

(57) ABSTRACT

A test and control apparatus, system and method for a wind farm, are provided. The test and control apparatus includes a first communication interface, a second communication interface, and a processor card. The processor card receives, via the first communication interface, a frequency regulation instruction issued by the grid scheduling server, receives operation information of the wind power generation unit via the second communication interface, and calculates, based
(Continued)

on the operation information of the wind power generation unit, a first frequency regulation capability of the wind power generation unit performing a frequency regulation without using the first energy storage battery. The processor card sends the frequency regulation instruction to the wind power generation unit without using the first energy storage battery, in a case that the first frequency regulation capability of the wind power generation unit satisfies a requirement of the frequency regulation instruction.

17 Claims, 8 Drawing Sheets

(51) Int. Cl.
    *F03D 7/04*     (2006.01)
    *H02J 3/00*     (2006.01)
    *F03D 17/00*     (2016.01)
    *F03D 7/02*     (2006.01)
    *H02J 13/00*     (2006.01)

(52) U.S. Cl.
    CPC ............... *H02J 3/38* (2013.01); *H02J 3/381* (2013.01); *H02J 3/466* (2020.01); *H02J 13/00* (2013.01); *H02J 2203/20* (2020.01); *H02J 2300/28* (2020.01)

(58) Field of Classification Search
    CPC .......... H02J 2300/28; H02J 3/001; H02J 3/38; H02J 3/381; H02J 13/00; H02J 13/0062; H02J 2203/20; Y02E 60/00; Y02E 10/76; Y02E 10/72; Y02E 40/70; Y04S 10/50; Y04S 40/20; G01R 31/34
    See application file for complete search history.

(56) References Cited

U.S. PATENT DOCUMENTS

| | | | |
|---|---|---|---|
| 10,141,744 B2* | 11/2018 | Wagoner ................... | H02J 7/00 |
| 10,283,964 B2* | 5/2019 | Wagoner ................ | G06Q 50/06 |
| 2012/0061960 A1 | 3/2012 | Yasugi et al. | |
| 2012/0306202 A1 | 12/2012 | Takahashi et al. | |
| 2014/0159485 A1* | 6/2014 | Daniel .............. | H02J 13/00034 |
| | | | 307/24 |
| 2014/0316592 A1 | 10/2014 | Haj-Maharsi et al. | |
| 2015/0275862 A1 | 10/2015 | Babazadeh et al. | |
| 2016/0254671 A1* | 9/2016 | Cutright ................... | H02J 3/32 |
| | | | 700/295 |
| 2016/0308361 A1* | 10/2016 | Zhao ...................... | H02M 7/44 |
| 2016/0352102 A1* | 12/2016 | Zhao ...................... | H02J 3/381 |
| 2017/0005515 A1* | 1/2017 | Sanders ................... | H02J 3/14 |
| 2017/0054295 A1* | 2/2017 | Hansen ................. | H02J 7/0031 |
| 2017/0060113 A1* | 3/2017 | Kaucic ................. | G05B 13/041 |
| 2017/0298904 A1* | 10/2017 | Nielsen ..................... | F03D 9/11 |
| 2018/0363629 A1* | 12/2018 | Kjær et al. .............. | F03D 9/255 |
| 2020/0169219 A1* | 5/2020 | Zhang ..................... | H02S 50/00 |
| 2020/0259334 A1* | 8/2020 | Bao ........................... | H02J 3/48 |

FOREIGN PATENT DOCUMENTS

| | | |
|---|---|---|
| CN | 202435050 U | 9/2012 |
| CN | 102792581 A | 11/2012 |
| CN | 103094926 A | 5/2013 |
| CN | 104333037 A | 2/2015 |
| CN | 104600742 A | 5/2015 |
| CN | 205139222 U | 4/2016 |
| JP | 2015080378 A | 4/2015 |
| WO | WO 2012/171532 A2 | 12/2012 |
| WO | WO 2014/071948 A1 | 5/2014 |

OTHER PUBLICATIONS

J. Driesen and K. Visscher, "Virtual synchronous generators," 2008 IEEE Power and Energy Society General Meeting—Conversion and Delivery of Electrical Energy in the 21st Century, Pittsburgh, PA, USA, 2008, pp. 1-3, doi: 10.1109/PES.2008.4596800.*
Extended European Search Report issued in corresponding European Patent Application No. 17868489.0, dated Feb. 19, 2019.
Australian 1$^{st}$ Office Action issued in corresponding Australian Application No. 2017352550, dated Mar. 15, 2019.
Wu, Linlin, et al., "A Novel Frequency Regulation Strategy with the Application of Energy Storage System for Large Scale Wind Power Integration", 2015 Seventh Annual IEEE Green Technologies Conference, dated Apr. 15, 2015, pp. 221-226.
International Search Report issued in International Application No. PCT/CN2017/090542, mailed from the State Intellectual Property Office of China dated Oct. 11, 2017.
Jiang, Q., et al., "Review of Wind Power Integration Control With Energy Storage Technology", Power System Technology, vol. 39, No. 12, dated Dec. 2015.
Kiu, A., "Research on the Frequency Regulation Control Strategy for Direct-driven Permanent Magnet Wind Power Generation System with Flywheel Energy Storage Unit", School of Electrical Engineering of Chongqing University, Chongqing, China, dated May 2014.

* cited by examiner

TEST AND CONTROL APPARATUS, SYSTEM AND METHOD FOR WIND FARM

This application is a national stage of International Application No. PCT/CN2017/090542, filed on Jun. 28, 2017, which claims priority to Chinese Patent Application No. 201611217583.9, filed on Dec. 26, 2016. Both of the aforementioned applications are hereby incorporated by reference in their entireties.

TECHNICAL FIELD

The present disclosure relates to the technical field of power control, and in particular, to a test and control apparatus, system and method for a wind farm.

BACKGROUND

With the development of society and economy, electricity resources have become a necessity in people's lives. Besides traditional methods such as the thermal power generation and the hydroelectric power generation, there are emerging power generation methods for providing power resources such as the wind power generation and the nuclear power generation. Due to its advantages of being clean, renewable and not destroying the geographical environment, the wind power has drawn much attention from people.

The conventional wind power test and control methods mainly use the traditional thermal power generation control methods. Due to the unstable nature of the wind, the voltage output from the wind power generation unit in the wind farm is not stable. In addition, since the wind power generation units are distributed in the wind farm, the power generated by the wind power generation units is not synchronized. In order to improve the grid's ability to accept the distributed wind power, people try to use the virtual synchronous generator to synchronize the distributed wind power. As the virtual synchronous generator requires a strict sustained and stable voltage, the effect of the virtual synchronous generator is not satisfactory.

The conventional wind power generation unit and the virtual synchronous generator used in the wind farm cannot provide continuous and stable voltage and cannot effectively accomplish the task of frequency regulation and work.

SUMMARY

In view of above one or more problems, a test and control apparatus, a test and control system, and a test and control method for a wind farm, are provided according to embodiments of the present disclosure.

In one aspect, a test and control apparatus for a wind farm is provided, where the wind farm includes a wind power generation unit, a first energy storage battery arranged at a direct current bus side of the wind power generation unit, a second energy storage battery arranged in the wind farm, and a reactive compensation device; and the test and control apparatus includes:
  a first communication interface, a second communication interface, and a processor card, where
  the first communication interface is configured to connect a grid scheduling server, the second communication interface is configured to connect the wind power generation unit, and the processor card is connected to the first communication interface and the second communication interface respectively;
  the processor card receives a frequency regulation instruction issued by the grid scheduling server via the first communication interface, receives operation information of the wind power generation unit via the second communication interface, and calculates a first frequency regulation capability of the wind power generation unit without using the first energy storage battery based on the operation information of the wind power generation unit; and the processor card sends the frequency regulation instruction to the wind power generation unit and does not start the first energy storage battery, in a case that the first frequency regulation capability of the wind power generation unit satisfies the frequency regulation instruction.

In another aspect, a test and control system for a wind farm is provided, the test and control system including:
  the above test and control apparatus for the wind farm.

In yet another aspect, a test and control method for a wind farm is provided, where the wind farm includes a wind power generation unit, a first energy storage battery arranged at a direct current bus side of the wind power generation unit, a second energy storage battery arranged in the wind farm, and a reactive compensation device; and the test and control method includes:
  receiving a frequency regulation instruction;
  receiving current wind speed information of the wind farm;
  calculating a first frequency regulation capability of the wind power generation unit without using the first energy storage battery, based on the current wind speed information, and determining whether the first frequency regulation capability satisfies a requirement of the frequency regulation instruction; and
  sending the frequency regulation instruction directly to the wind power generation unit without starting the first energy storage battery, in a case that the first frequency regulation capability satisfies the requirement of the frequency regulation instruction.

With the test and control apparatus for the wind farm, the test and control system for the wind farm, and the test and control method for the wind farm according to embodiments of the present disclosure, when the wind speed changes but can meet the requirement of the frequency regulation (that is, the wind power of the wind farm is large and the frequency regulation capability of the wind power generation is large), the wind farm can output a continuous and stable voltage only with the frequency regulation capability of the wind power generation unit, and can achieve a frequency regulation task successfully without starting the battery, thereby improving reliability of the frequency regulation and saving the energy of the battery.

The test and control apparatus for the wind farm and the test and control system for the wind farm according to embodiments of the present disclosure, can operate stably and efficiently to ensure that the test and control precision and time meet the requirement of the virtual synchronous generator. Therefore, external properties of a conventional wind power generation unit are matched, so that the entire power generation situation of the wind farm may be similar to that of the conventional thermal power generation unit, thereby meeting the national requirement for a grid using new energy and enabling the grid to operate stably with an increasing proportion of new energy.

BRIEF DESCRIPTION OF THE DRAWINGS

To illustrate technical solutions according to embodiments of the disclosure more clearly, the following briefly describes the drawings according to embodiments of the disclosure. Apparently, the drawings are only some embodiments of the present disclosure, and other drawings may be obtained by those skilled in the art according to those drawings without creative efforts.

DETAILED DESCRIPTION OF TUE EMBODIMENTS

To make the object, technical solutions and advantages of the present disclosure clearer, the technical solutions according to the embodiments of the present disclosure will be described clearly and completely as follows in conjunction with the drawings in the embodiments of the present disclosure. Those skilled in the art should understand that, in claims, the term "include" does not exclude other devices or steps, the indefinite article "a" does not exclude a plurality, and the terms "first" and "second" are used to indicate names and are not used to indicate a specific sequence.

In addition, it should be noted that, in the case of no conflict, the embodiments in the present disclosure and the features in the embodiments may be combined with each other, and the order of the steps may be adjusted mutually. For conciseness of description, the same or similar elements in the embodiments will not be further described, and the embodiments in the present disclosure may be referred to each other. The present disclosure will be described in detail below with reference to the accompanying drawings and embodiments.

Figure 1:
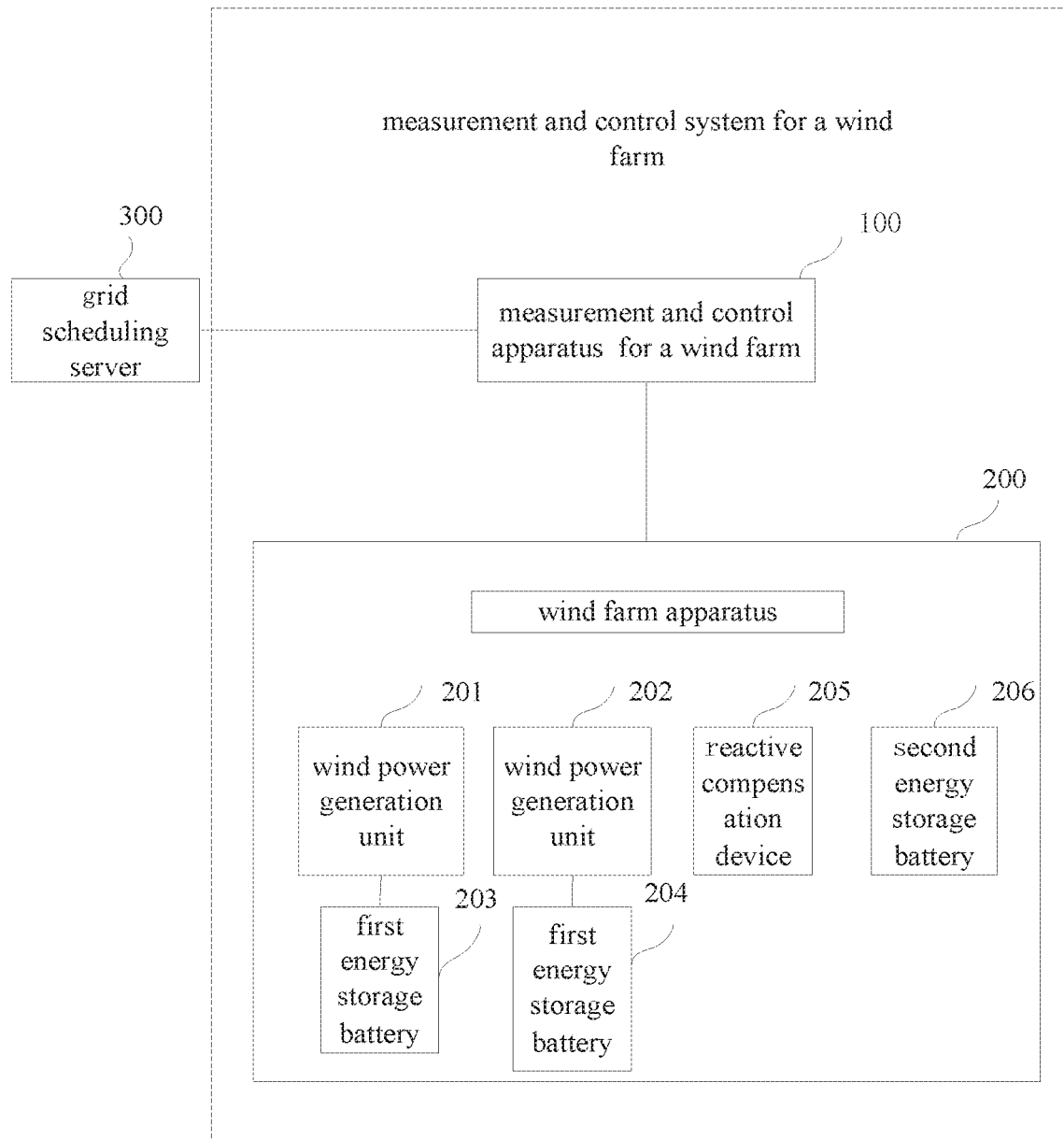
FIG. 1 is a schematic structural diagram of a test and control system for a wind farm according to an embodiment of the present disclosure.

FIG. 1 is a schematic structural diagram of a test and control system for a wind farm according to an embodiment of the present disclosure.

As shown in FIG. 1, a test and control system 1000 for a wind farm may include a test and control apparatus 100 for the wind farm and a wind farm apparatus 200, where the test and control apparatus 100 for the wind farm can exchange flow information with a grid scheduling server 300 external to the system 1000, thereby achieving a frequency regulation task (namely, a frequency regulation instruction) or a work task, issued by the grid scheduling server 300.

According to the embodiment of the disclosure, the grid scheduling server 300 may monitor and schedule a grid scheduling automation system and an electricity marketing system. Generally, a grid scheduling server 300 is arranged in each province. The grid scheduling server 300 of each province exchanges electricity information with each power plant in the province, and sends a task such as a frequency regulation task or a work task to each power plant.

The wind farm apparatus 200 may include wind power generation units 201 and 202 (the wind power generation units may be connected via a gathering circuit), first energy storage batteries 203 and 204 respectively arranged at direct current bus sides of the wind power generation units 201 and 202, a reactive compensation device 205, and a second energy storage battery 206.

In some embodiments, the first energy storage battery 203 may be configured for a single wind power generation unit, and the second storage battery 206 may be configured for the whole wind farm. Generally, the second energy storage battery is a large-scale energy storage battery, whose volume is much greater than that of the first energy storage battery 203. The reactive compensation device 205 may be, for example, SVC (static var compensator) and SVG (static var generator).

It can be understood that the number of hardware devices in the above system is illustrative, and may be adjusted as needed, in other words, multiple hardware devices may be added into or omitted from the system 1000. For example, the system 1000 may only include the test and control apparatus 100 for the wind farm. For another example, the system 1000 may further include an auxiliary device for the wind farm, where the auxiliary device may include a cable, a switch, and a protection device, etc. Each of the following embodiments may be applied to the system 1000. For a concise description, the embodiments may refer to each other, and the same or similar content is not repeated.

Figure 2:
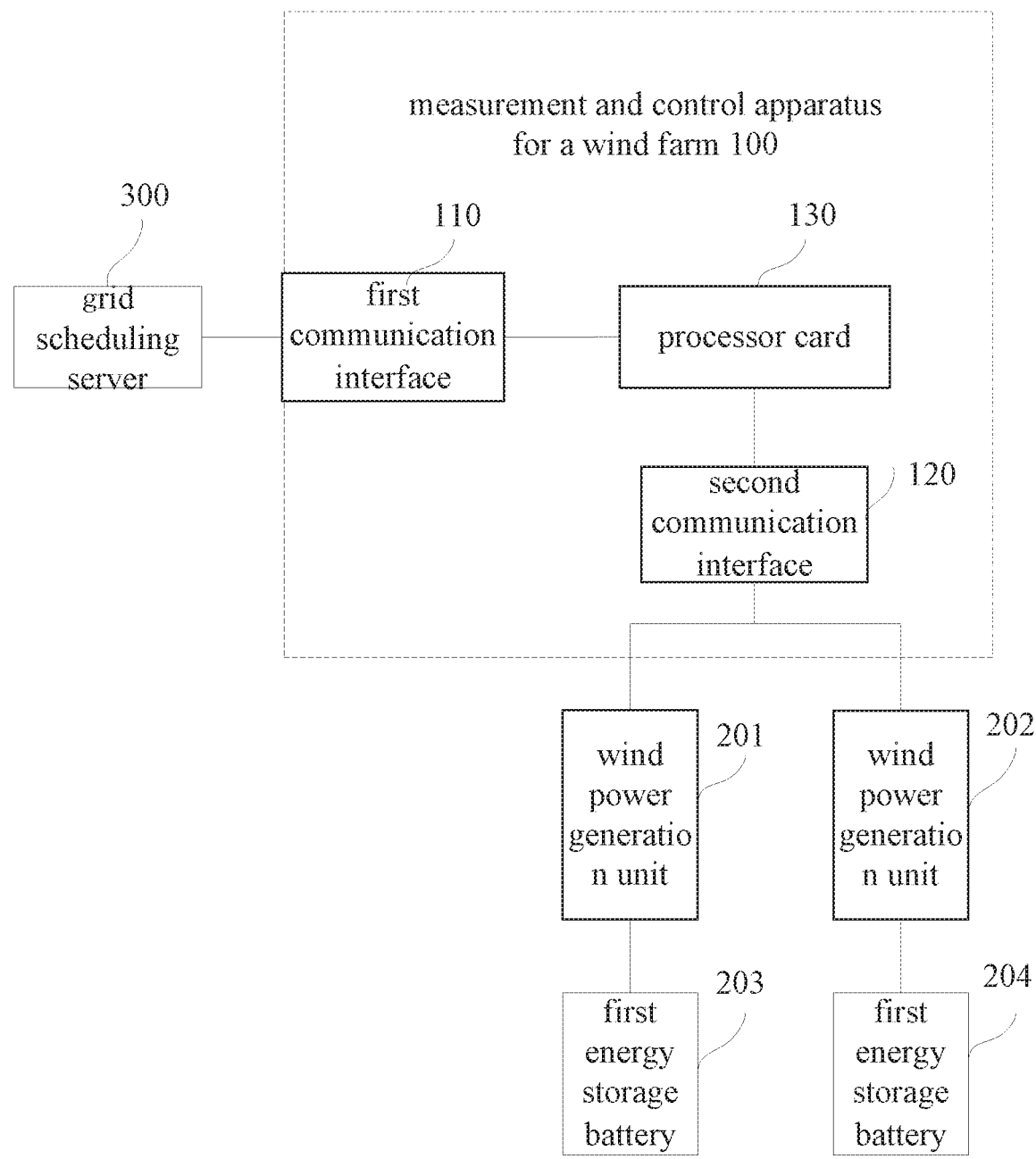
FIG. 2 is a schematic structural diagram of a test and control apparatus for a wind farm according to an embodiment of the present disclosure.

FIG. 2 is a schematic structural diagram of a test and control apparatus for a wind farm according to an embodiment of the present disclosure.

As shown in FIG. 2, the test and control apparatus 100 for the wind farm may include a first communication interface 110, a second communication interface 120, and a processor card 130. The first communication interface 110 is configured to connect the grid scheduling server 300, the second communication interface 120 is configured to connect wind power generation units 201 and 202, and the processor card 130 is respectively connected to the first communication interface 110 and the second communication interface 120. According to the embodiment of the disclosure, the first communication interface 110 and the second communication interface 120 may be, for example, Ethernet interfaces, and the processor card 130 may be, for example, a CPU card.

In the embodiment shown in FIG. 2, the processor card 130 receives, via the first communication interface 110, a frequency regulation instruction issued by the grid scheduling server 300, receives operation information of the wind power generation units 201 and 202 via the second communication interface 120, and calculates, based on the operation information of the wind power generation units 201 and 202, first frequency regulation capabilities of the wind power generation units 201 and 202 which perform the frequency regulation without using the first energy storage batteries 203 and 204. The processor card 130 sends the frequency regulation instruction to the wind power generation units 201 and 202 and does not start the first energy storage batteries 203 and 204, in a case that the first frequency regulation capabilities of the wind power generation units 201 and 202 meet a requirement of the frequency regulation instruction issued by the grid scheduling server 300. In this way, when the wind speed changes but can meet the requirement of frequency regulation (that is, the wind power of the wind farm is large and the frequency regulation capability of the wind power generation is large), the wind farm can output a continuous and stable voltage only with the frequency regulation capability of the wind power generation units, and can achieve a frequency regulation task successfully without starting the battery, thereby improving reliability of frequency regulation and saving the energies of the batteries.

In the embodiment shown in FIG. 2, the processor card 130 further calculates second frequency regulation capabilities of the wind power generation units 201 and 202 which perform the frequency regulation using the first energy storage batteries 203 and 204; determines whether the second frequency regulation capabilities of the wind power generation units 201 and 202 meet the requirement of the frequency regulation instruction issued by the grid scheduling server 300; and sends the frequency regulation instruction to the wind power generation units 201 and 202 and starts the first energy storage batteries 203 and 204, in a case that the second frequency regulation capabilities meet the requirement of the frequency regulation instruction issued by the grid scheduling server 300. In this way, the wind farm can make use of the first energy storage battery to accomplish the frequency regulation task when the wind power generation units are unable to complete the frequency regulation task by itself with a mild wind.

In the embodiment shown in FIG. 2, the processor card 130 further starts a second energy storage battery 206 besides starting the first energy storage batteries 201 and 202; and sends the frequency regulation instruction to the wind power generation units 201 and 202, in a case that the second frequency regulation capabilities do not meet the requirement of the frequency modulation regulation instruction issued by the grid scheduling server 300. In this way, the wind farm can accomplish the task of frequency regulation by further using the second energy storage battery when the wind power is small, and the frequency regulation task cannot be completed by collaboratively using the wind power generation units and the first energy storage batteries.

Figure 3:
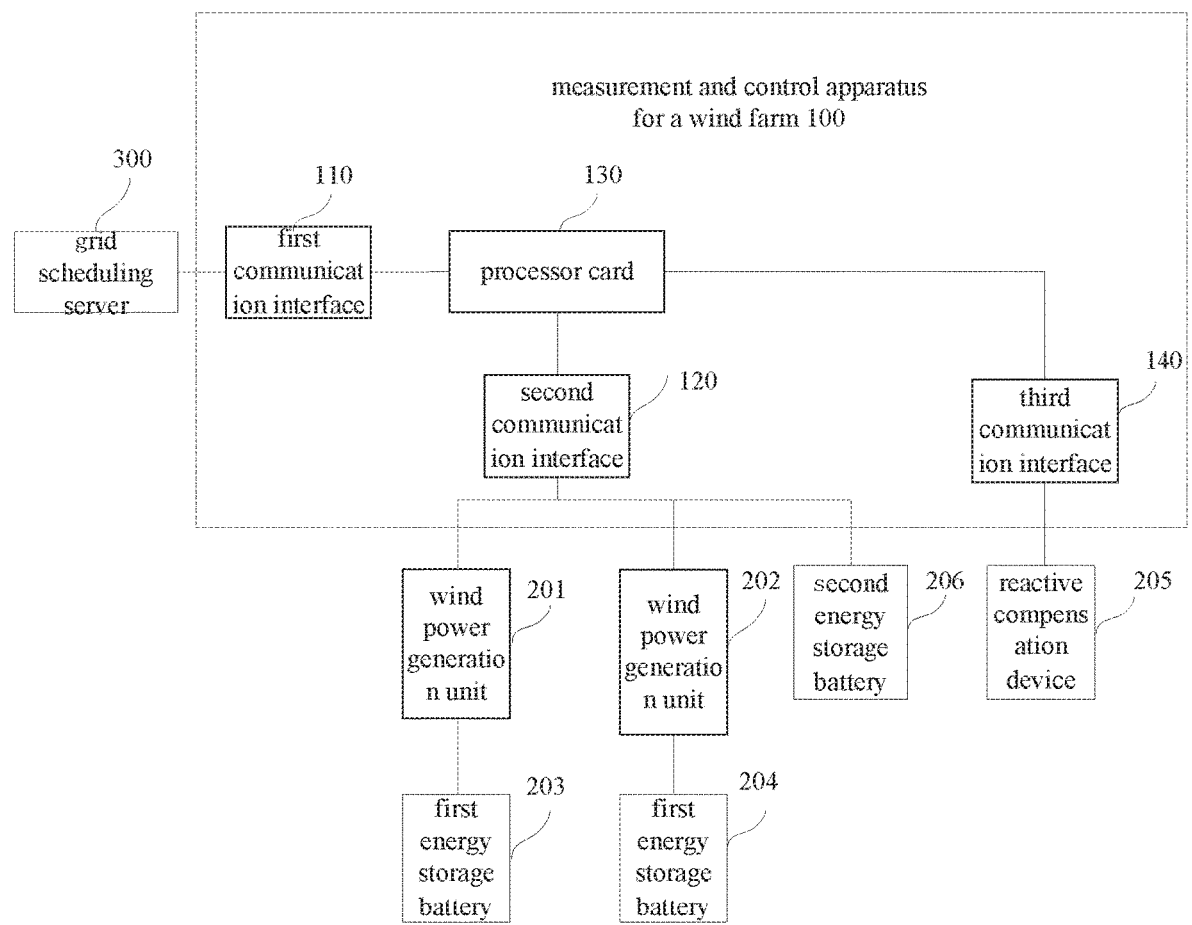
FIG. 3 is another schematic structural diagram of a test and control apparatus for a wind farm according to an embodiment of the present disclosure.

FIG. 3 is another schematic structural diagram of a test and control apparatus for a wind farm according to an embodiment of the present disclosure.

According to the embodiment shown in FIG. 3, a third communication interface 140 is added on the basis of the embodiment shown in FIG. 2. In the embodiment shown in FIG. 3, the third communication interface 140 is connected to the reactive compensation device 205, and the second communication interface 120 is connected to the second energy storage battery 206.

In the embodiment shown in FIG. 3, the processor card 130 further receives an active power demand instruction from the grid scheduling server 300 via the first communication interface 110, and sends the active power demand instruction to the wind power generation units 201 and 202, in a case that the first frequency regulation capabilities of the wind power generation units 201 and 202 meet a requirement of the active power demand instruction.

In the embodiment shown in FIG. 3, the processor card 130 further receives an reactive power demand instruction from the grid scheduling server 300 via the first communication interface 110; receives operation information of the reactive compensation device 205 via the third communication interface 140; calculates capability information of the reactive compensation device 205 based on the operation information of the reactive compensation device 205; and sends the reactive power demand instruction to the reactive compensation device 205, in a case that the capability information of the reactive compensation device 205 satisfies a requirement of the reactive power demand instruction.

Figure 4:
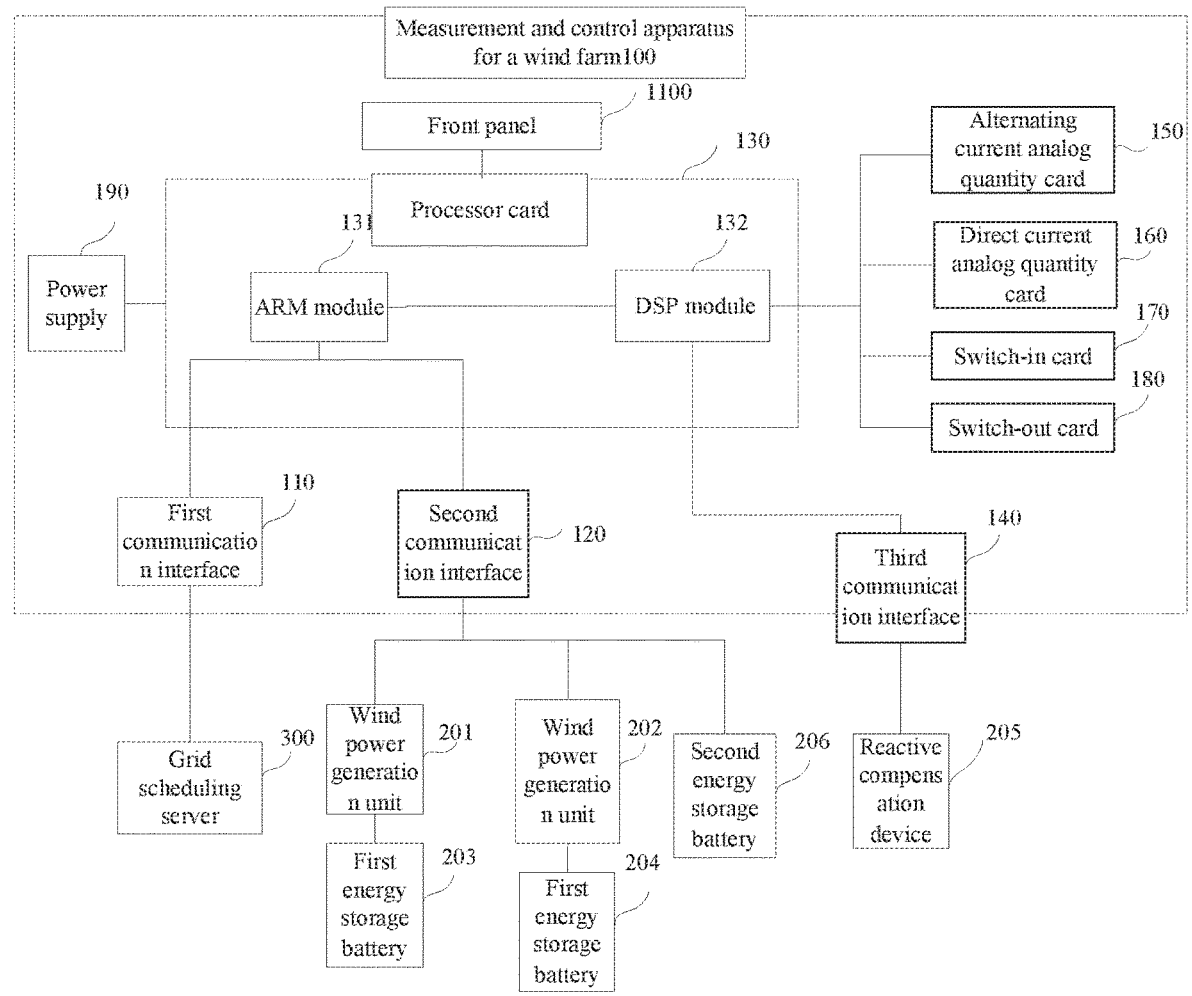
FIG. 4 is yet another schematic structural diagram of a test and control apparatus for a wind farm according to an embodiment of the present disclosure.

FIG. 4 is yet another schematic structural diagram of a test and control apparatus for a wind farm according to an embodiment of the present disclosure.

The embodiment shown in FIG. 4 differs from the embodiment shown in FIG. 3 in that an alternating current analog quantity card 150, a direct current analog quantity card 160, a switch-in card 170, a switch-out card 180, a power supply 190 and a front panel 1100 are added on the basis of the embodiment shown in FIG. 3. The processor card 130 includes an ARM (advanced RISC machines) module 131 and a DSP (digital signal processing) module 132.

In the embodiment shown in FIG. 4, the ARM module 131 is connected to the first communication interface 110, the second communication interface and the DSP module 132. The DSP module 132 is connected to the third communication interface 140, the alternating current analog quantity card 150, the direct current analog quantity card 160, the switch-in card 170 and the switch-out card 180. The power supply 190 and the front panel 1100 are respectively connected to the processor card 130. The ARM module 131 and the DSP module 132 are connected with each other via a communication bus, and the communication bus may be, for example, a SPI bus.

In the embodiment shown in FIG. 4, the alternating current analog quantity card 150 is connected to the processor card 130. The alternating current analog quantity card 150 is configured to collect information regarding voltage and current (namely, alternating current analog quantity information in the wind farm) at a high voltage side and a low voltage side of a main transformer of the wind farm, and send the collected alternating current analog quantity information via, for example, the communication bus of the test and control system, to the processor card 130 for calculation and processing. Variation of the alternating current analog quantity is periodical, and a typical quantity of the alternating current analog quantity is a 1000 Hz sinusoidal quantity.

In the embodiment shown in FIG. 4, the direct current analog quantity card 160 is connected to the processor card 130. The direct current analog quantity card 160 is configured to collect direct current analog quantity information of the wind farm apparatus, and send the collected direct current analog quantity information via, for example, the communication bus of the test and control system, to the processor card 130 for calculation and processing. Generally, the direct current analog quantity is a continuous quantity varying slowly, and variation of the direct current analog quantity is continuous and slow, or it can be considered that the variation of the direct current analog quantity is constant.

In the embodiment shown in FIG. 4, the switch-in card 170 is connected to the processor card 130. The switch-in card 170 is configured to collect switch state information of the wind farm apparatus, and send the collected switch state information to the processor card 130. For example, the switch-in card 170 may collect the switch state information of a switch and energy storage batteries of the wind farm, and send the collected switch state information via the communication bus of the test and control system, to the processor card 130 for calculation and processing.

In the embodiment shown in FIG. 4, the switch-out card 180 is connected to the processor card 130. The switch-out card 180 is configured to receive a switch-out signal of the processor card 130, and send switch-out information to the wind farm apparatus. For example, the switch-out card 180 may output the switch-out signal and control the switch and switching of multiple energy storage batteries of the wind farm, based on calculation and a control strategy of the processor card 130.

It should be noted that the implementation of the function card shown in FIG. 4 may be hardware, software, firmware, or a combination thereof. When implemented in hardware, it may for example be an electronic circuit, an application specific integrated circuit (ASIC), a suitable firmware, a plug-in, a function card or the like. When implemented in software, the elements according to the present disclosure are programs or code segments used to perform the required tasks. The program or code segments may be stored in a machine-readable medium or transmitted over a transmission medium or communication link through a data signal carried in the carrier wave. "Machine-readable medium" may include any medium capable of storing or transmitting information. Examples of machine-readable media include an electronic circuit, a semiconductor memory device, a ROM, a flash memory, an erasable ROM (EROM), a floppy disk, a CD-ROM, an optical disk, a hard disk, a fiber optic media, a radio frequency (RF) link, and the like. The code segments may be downloaded via a computer network, such as the Internet, an intranet, or the like.

In the embodiment shown in FIG. 4, the front panel 1100 is connected to the processor card 130. The front panel 1100 is configured to display test and control information for measuring and controlling the wind farm. According to the embodiment of the disclosure, the front panel 1100 (LCD) is used as a human-machine interface of the test and control device 100, to communicate with the processor card 130 (which may be a CPU card) via a serial port. The front panel 1100 may be configured to display an overall power generation status current system statuses: normal, remote indicator, local indicator, device malfunction, system malfunction, TV/TA (current transformer/voltage transformer) disconnection, strategy locking indicator, etc.) of the wind farm via an LCD, so that it is very convenient for an operation maintainer to view a power supplying status.

In the embodiment shown in FIG. 4, the power supply 190 is respectively connected to the processor card 130, the front panel 1100 and a direct current power cabinet (not shown). The power supply 190 may be acquired from the direct current power cabinet of the wind farm. In the case of alternating current loss, it can also be ensured that the entire test and control system has a stable power supply.

In some embodiments, the processor card 130 may include three types of interface: an Ethernet interface 1, an Ethernet interface 2, and a 485 communication interface. The processor card 130 may communicate with the grid scheduling server 300 via the Ethernet interface 1, so as to exchange the flow information (such as active power demand information and frequency regulation information). The Ethernet interface 2 of the processor card 130 communicates with an optical fiber network of the wind farm, so as to receive following information of all the wind power generation units of the wind farm: voltage, current, active power, reactive power, power factor, frequency, warning information, and error information. Then, the processor card 130 issues an active power demand, a reactive power demand, frequency regulation information, etc., to all the wind power generation units. Then, the processor card 130 communicates with SVC and SVG devices of the wind farm, via the 485 communication interfaces (two channels) and CAN communication interfaces (two channels), so as to issue a reactive power adjustment and control instruction.

In some embodiments, the ARM module 131 in the processor card 130 is configured to exchange information with the grid scheduling server 300, the wind power generation units 201 and 202, the reactive compensation device 205, and the DSP module 132, so as to send the frequency regulation instruction, the active power demand instruction, the reactive power demand instruction, and instructions to start the first energy storage batteries and the second energy storage battery.

In some embodiment, an ARM calculation unit (namely, the ARM module 131) may perform a transient response, and communicate with the grid scheduling server, the wind power generation units, and the large-scale energy storage battery. In the embodiment shown in FIG. 4, switching between tasks (such as the frequency regulation tasks) may take less that 1 ms, which ensures the timeliness of the task responses, and satisfies the requirement that the overall frequency regulation requirement is less than 100 ms.

In some embodiments, the DSP module 132 of the processor card 130 may issue switch-out instructions to the wind power generation units, the reactive compensation device, the first energy storage batteries, and the second energy storage battery, based on the frequency regulation instruction, the active power demand instruction, the reactive power demand instruction, and the instruction for starting the first energy storage batteries and the second energy storage battery (which may be achieved via the switch-in card 170 and the switch-out card 180).

In some embodiments, the DSP calculation unit (i.e., the DSP module 132) may perform a transient response. In performing the transient response, the DSP calculation unit can switch the energy storage batteries quickly, to achieve the frequency regulation, the power quality management, etc. For an emergency task (the transient response), the device in the wind farm can be timely and quickly adjusted to achieve the frequency regulation instruction, with the DSP calculation unit (i.e., the DSP module) and the fast switch-out instructions.

In some embodiments, when it is required to switch the large-scale energy storage battery for the frequency regulation, the DSP module outputs via an interface quickly, so as to meet a requirement of switching the battery quickly. Specifically, the DSP module may communicate with the SVC/SVG of the wind farm via the 485 communication interface and the CAN (controller area network) communication interface of the DSP module, and may cooperate with the SVC/SVG in real time to control a voltage of the wind farm, to ensure a stable output voltage.

In a case that there is a fluctuation or an abnormity of the grid, and the power quality of the whole wind farm exceeds a specified power quality threshold (for example, second harmonic, third harmonic, fifth harmonic, seventh harmonic and ninth harmonic voltages and currents exceed a preset software threshold), the power quality can meet a requirement of the specified software threshold (such as 20%) by switching a corresponding battery unit.

In the embodiment shown in FIG. 4, by the cooperation of the ARM module and the DSP module, precision performance indexes and response speed of the test and control apparatus can meet following requirements.

(1) Test Precision:

for the test, voltage level is 100V and 0.2 S grade, current level is 5 A (1 A optional) and 0.2 S grade, power is 0.5 S grade, frequency is 0.01 Hz, and power factor is 0.01; and for the control, a voltage fluctuation of 35 kV is less than 0.5 kV, a voltage fluctuation of 110 kV is less than 2 kV, a voltage fluctuation of 220 kV is less than 3 kV, reactive power is 1.0 MVar, and power factor is 0.01.

(2) Response speed (for a task execution, a switching task, a DSP emergency task, and an ARM communication and routine task, etc.):

steady response time of the system to the grid: <6 S; and transient response time of the system to the grid: <30 ms (for voltage and current and <100 ms (for frequency).

For an emergency task (the transient response), the device of the wind farm can be adjusted timely and quickly via the DSP calculation unit and the quick switch-out instructions, thereby achieving a scheduling instruction of the grid scheduling server.

For a routine task (the steady response), a voltage stabilization strategy and a frequency regulation strategy can be given through the ARM calculation unit.

Figure 5:
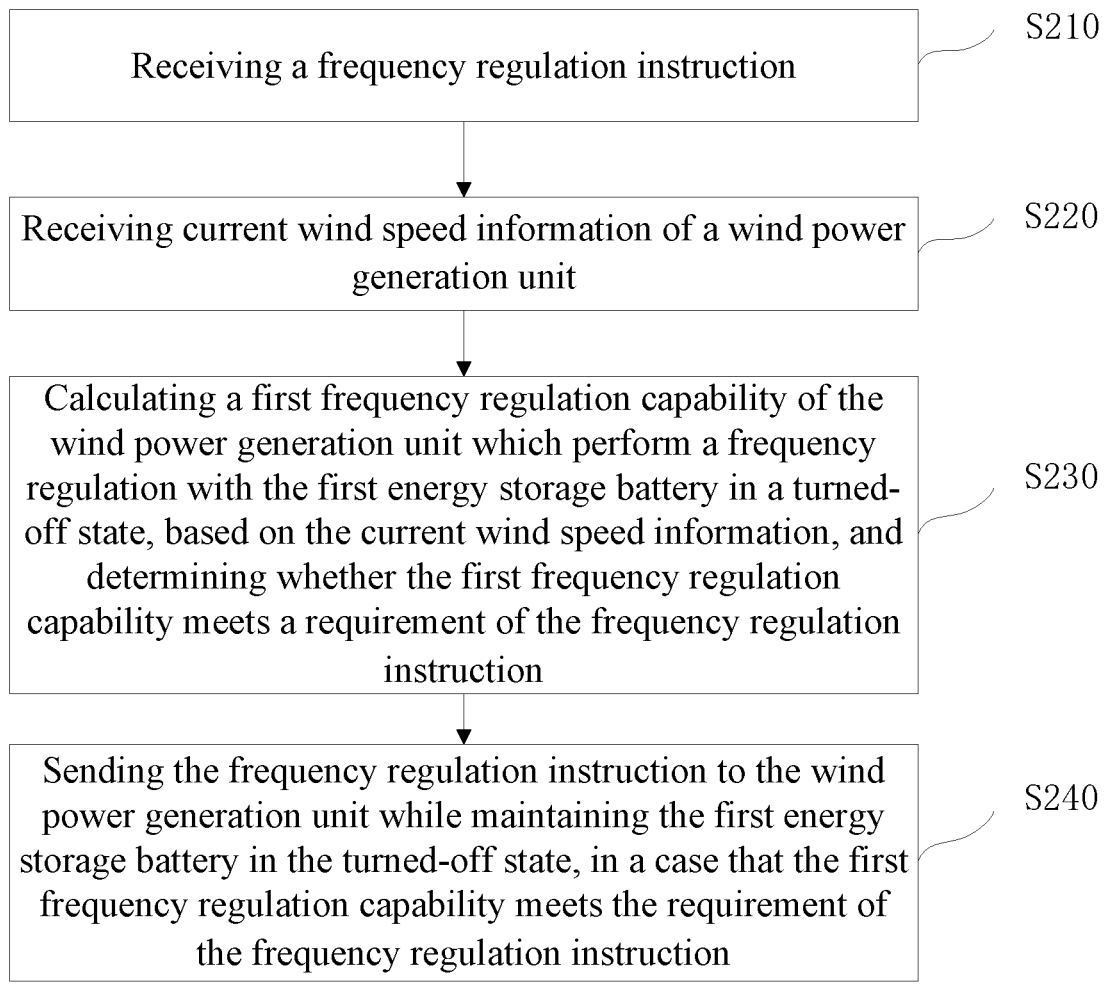
FIG. 5 is a flowchart of a test and control method for a wind farm according to an embodiment of the present disclosure.

FIG. 5 is a flowchart of a test and control method for a wind farm according to an embodiment of the present disclosure. As shown in FIG. 5, the test and control method includes steps S210 to S240.

In step S210, a frequency regulation instruction is received.

The frequency regulation instruction may be issued from the grid scheduling server 300 shown in FIG. 1.

In step S220, current wind speed information of a wind power generation unit is received.

The current wind speed information of the wind power generation unit may be information for current speeds of winds around the wind power generation units, an average value of wind speed values collected from blades of the wind power generation units, or an average value of wind speed values collected from any places around the wind power generation units. The specific current wind speed information of the wind power generation unit may be collected actively or received passively as needed, which is not limited.

In step S230, a first frequency regulation capability of the wind power generation unit which perform the frequency regulation without using a first energy storage battery is calculated, based on the current wind speed information, and whether the first frequency regulation capability satisfies a requirement of the frequency regulation instruction is determined. Specific implementation of this step is described in detail hereinafter.

In step S240, the frequency regulation instruction is sent to the wind power generation unit without starting the first energy storage battery, in a case that the first frequency regulation capability satisfies the requirement of the frequency regulation instruction.

Specifically, the frequency regulation capability of the wind power generation unit may be selected based on a principle that the frequency regulation capability is equal to the requirement of the frequency regulation instruction, or is higher than the requirement of the frequency regulation instruction and gets close to the requirement of the frequency regulation instruction as much as possible, so that the requirement of the frequency regulation instruction can be met without wasting power.

Therefore, the frequency regulation capability of the wind power generation unit which performs the frequency regulation without using the battery is calculated based on the current wind speed information, so that in case of abnormal variation of the wind speed, a frequency regulation task can be achieved accurately and reliably without starting the battery.

In some embodiments, the step S230 (the first frequency regulation capability of the wind power generation unit which performs the frequency regulation without using the first energy storage battery is calculated, based on the current wind speed information, and whether the first frequency regulation capability satisfies the requirement of the frequency regulation instruction is determined) may include sub-steps S231 and S232.

In S231, the first frequency regulation capabilities of multiple wind power generation units which perform frequency regulation without using the first energy storage batteries are calculated.

For simple calculation and clear illustration, in following embodiments, calculation methods of various frequency regulation capabilities are illustratively described as the wind farm includes only three wind power generation units (a wind power generation unit 201, a wind power generation unit 202, and a third wind power generation unit).

For example, the respective frequency regulation capabilities N1, N2 and N3 of the wind power generation unit 201, the wind power generation unit 202, and the third wind power generation unit which perform the frequency regulation without using the first energy storage batteries are calculated.

In S232, the calculated first frequency regulation capabilities of the multiple wind power generation units which perform the frequency regulation without using the first energy storage batteries are combined in multiple ways for calculation, to acquire first combination frequency regulation capacities.

For example, the frequency regulation capabilities of the wind power generation unit 201 and the wind power generation unit 202 which perform the frequency regulation without using the first energy storage batteries are combined, and a first one of first combination frequency regulation capabilities which has a frequency regulation capability of N1+N2 is acquired.

For another example, the frequency regulation capabilities of the wind power generation unit 201 and the third wind power generation unit which perform the frequency regulation without using the first energy storage batteries are combined, and a second one of first combination frequency regulation capabilities which has a frequency regulation capability of N1+N3 is acquired.

For another example, the frequency regulation capabilities of the wind power generation unit 202 and the third wind power generation unit which perform the frequency regulation without using the first energy storage batteries are combined, and a third one of first combination frequency regulation capabilities which has a frequency regulation capability of N2+N3 is acquired.

For another example, the frequency regulation capabilities of the wind power generation unit 201, the wind power generation unit 202 and the third wind power generation unit which perform the frequency regulation without using the first energy storage batteries are combined, and a fourth one of first combination frequency regulation capabilities which has a frequency regulation capability of N1+N2+N3 is acquired.

Specifically, without starting the first energy storage batteries, a data table of the first combination frequency regulation capabilities may be shown as following Table (1).

TABLE (1)

Data table of first frequency regulation capacities
(which perform the frequency regulation without
using the first energy storage battery)

| combination ways | First frequency regulation capability |
|---|---|
| wind power generation unit 201 | N1 |
| wind power generation unit 202 | N2 |
| wind power generation unit 203 | N3 |
| wind power generation unit 201 + wind power generation unit 202 | N1 + N2 |
| wind power generation unit 201 + wind power generation unit 203 | N1 + N3 |
| wind power generation unit 202 + wind power generation unit 203 | N2 + N3 |
| wind power generation unit 201 + wind power generation unit 202 + wind power generation unit 203 | N1 + N2 + N3 |

In the above table, information about units of specific numerical values is omitted. It can be appreciated that the number of the wind power generation units may not be limited, and the calculation method may change flexibly. For example, multiple frequency regulation capability values may be combined in different manners as needed.

Therefore, the frequency regulation capability of the wind power generation unit which perform the frequency regulation without using the battery is calculated based on the current wind speed information, so that in case of abnormity of wind speed variation, the wind farm can output a continuous and stable voltage with the frequency regulation capability of the wind power generation unit, and achieve the frequency regulation task successfully without starting the battery, which not only improves the reliability of the frequency regulation, but also saves the battery energy.

As a first variation of the embodiment shown in FIG. 5, step S250 and step S260 may be added on the basis of the embodiment shown in FIG. 5.

In step S250, a second frequency regulation capability of the wind power generation unit which perform the frequency regulation using the first energy storage battery is further calculated and whether the second frequency regulation capability satisfies the requirement of the frequency regulation instruction is determined, in a case that the first frequency regulation capability does not meet the requirement of the frequency regulation instruction. Specific implementation of the step is described in detail hereinafter.

In step S260, the frequency regulation instruction is sent to the wind power generation unit and the first energy storage battery is started, in a case that the second frequency regulation capability satisfies the requirement of the frequency regulation instruction.

In the embodiment shown in FIG. 5, the first energy storage battery may be a 200 KW energy storage battery at the direct current bus side of the wind power generation unit, and a specific configuration way may be flexibly adjusted as needed. Similarly, the frequency regulation capability of the wind power generation unit may be selected based on the principle that the frequency regulation capability is equal to the requirement of the frequency regulation instruction, or is higher than the requirement of the frequency regulation instruction and gets close to the requirement of the frequency regulation instruction as much as possible, so that the requirement of the frequency regulation instruction can be met without wasting power.

Therefore, it can be seen that, in case of small wind power, the wind farm can also output the continuous and stable voltage, by timely starting the first energy storage battery to assist the frequency regulation when the wind power generation unit cannot meet the requirement of the frequency regulation.

In some embodiments, the step S250 (the second frequency regulation capability of the wind power generation unit which perform the frequency regulation using the first energy storage battery is further calculated and whether the second frequency regulation capability satisfies the requirement of the frequency regulation instruction is determined, in a case that the first frequency regulation capability does not meet the requirement of the frequency regulation instruction) may include sub-steps S251 and S252.

In S251, the second frequency regulation capabilities of multiple wind power generation units which perform the frequency regulation using the first energy storage battery are calculated.

For example, the respective frequency regulation capabilities M1, M2 and M3 of the wind power generation unit 201, the wind power generation unit 202, and the third wind power generation unit which perform the frequency regulation using the first energy storage battery are calculated.

In S252, the calculated second frequency regulation capabilities of the multiple wind power generation units which perform the frequency regulation using the first energy storage battery are combined in multiple ways for calculation, to acquire multiple second combination frequency regulation capacities.

Similarly, after the combination, when the first energy storage batteries are used, a data table of the second combined frequency regulation capabilities may be shown as following Table (2).

TABLE (2)

Data table of second frequency regulation capacities
(the first energy storage batteries are used)

| combination ways | Second frequency regulation capability |
|---|---|
| wind power generation unit 201 | M1 |
| wind power generation unit 202 | M2 |
| wind power generation unit 203 | M3 |
| wind power generation unit 201 + wind power generation unit 202 | M1 + M2 |
| wind power generation unit 201 + wind power generation unit 203 | M1 + M3 |
| wind power generation unit 202 + wind power generation unit 203 | M2 + M3 |
| wind power generation unit 201 + wind power generation unit 202 + wind power generation unit 203 | M1 + M2 + M3 |

As a second variation of the embodiment as shown in FIG. 5, step S270 may be added on the basis of the embodiment of the first variation.

In step S270, a second energy storage battery is further started besides starting the first energy storage battery and the frequency regulation instruction is sent to the wind power generation unit, in a case that the second frequency regulation capability does not meet the requirement of the frequency regulation instruction.

In this way, the frequency regulation can be assisted by timely starting the energy storage battery in the extreme case that the overall wind power of the wind farm is small, so that the wind farm can also output a continuous and steady voltage in this extreme situation.

In some embodiments, the first energy storage battery may be a 200 KW energy storage battery at the direct current bus side of the wind power generation unit, and the second energy storage battery may be a large-scale energy storage battery in the wind farm. Specific configuration ways of the energy storage batteries may be flexibly adjusted as needed, which is not limited.

The embodiment shown in FIG. 5 and its modified embodiment mainly illustrate the voltage frequency regulation strategy. Specifically, the voltage frequency regulation strategy may include the following three common cases.

In case of large wind, the torque of each wind power generation unit (excluding the 200 KW energy storage battery at the direct current bus side of the wind power generation unit) can support its own frequency regulation task. In such case, a converter of the wind power generation unit does not output the energy of the 200 KW energy storage battery, that is, the frequency regulation task is performed without using the energy storage battery of each wind power generation unit.

In case of small wind, the torque of each wind power generation unit (excluding the 200 KW energy storage battery at the direct current bus side of the single unit) cannot support its own frequency regulation task. The 200 KW energy storage battery provides energy at the direct current bus of the wind power generation unit, and serves as backup energy to support the frequency regulation torque. In other words, the frequency regulation task is performed using the energy storage battery of each wind power generation unit.

When the wind in the entire wind farm is small and the energy support of frequency regulation cannot be completed, the large energy storage battery in the wind farm can be switched by the ARM (microprocessor) calculation unit to support the power system frequency regulation task.

It can be understood that, based on the actual situation, a variety of frequency regulation methods for combining the wind power generation units may also be used. For example, the wind power generation unit performing frequency regulation without the energy storage battery and the wind power generation unit performing frequency regulation with the energy storage battery may be combined in different manners, and details are not described herein for conciseness.

Figure 6:
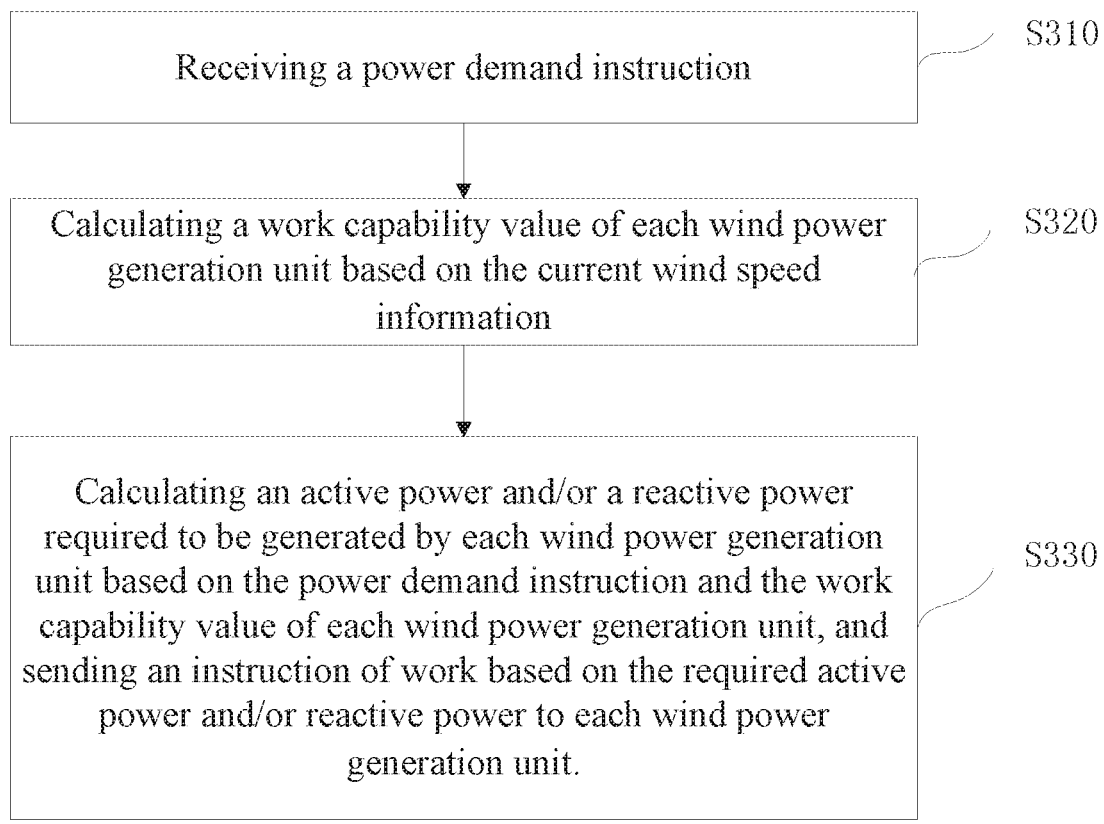
FIG. 6 is another flowchart of a test and control method for a wind farm according to an embodiment of the present disclosure.

FIG. 6 is another flowchart of a test and control method for a wind farm according to an embodiment of the present disclosure. As show in FIG. 6, the test and control method includes steps S310 to S330.

In step S310, a power demand instruction is received, where the power demand instruction includes an active power demand instruction and a reactive power demand instruction.

In step S320, a work capability value of each wind power generation unit is calculated based on current wind speed information.

In step S330, an active power and/or a reactive power required to be generated by each wind power generation unit are calculated based on the power demand instruction and the work capability value of each wind power generation unit, and an instruction for work based on the required active power and/or reactive power is sent to each wind power generation unit.

It can be understood that, the term "and/or" in the disclosure is merely an association relationship that describes an associated object, indicating that there may be three relationships, for example, A and/or B may indicate three cases that A exists alone, A and B, and B exists alone.

The embodiment mainly illustrates a voltage stabilization strategy. Specifically, the voltage stabilization strategy may be implemented as follows.

First, parameter information (voltage, current, active power, reactive power, power factor, frequency, warning information and error information, etc.) of the wind farm is received.

Then, the received parameter information of the wind farm is processed by an ARM module for calculation.

After that, the active power and the reactive power are distributed for the wind power generation units, and an active instruction or a reactive instruction is issued to all wind power generation units, thereby achieving a power demand task of the wind farm issued by a grid scheduling server.

More specifically, multiple tables may be designed for a power demand with reference to the above frequency regulation strategy, so as to provide a preferable work solution for selection, which is not further described in detail for concision.

Therefore, after receiving the power demand information, the precision calculation of the work ability of each wind power generation unit based on the current wind speed information can not only achieve precise work but also work gracefully, accurately and reliably in abnormal situations, thereby improving the power quality of the wind farm.

As a variation of the embodiment shown in FIG. 6, the embodiment shown in FIG. 6 may be combined with the embodiment shown in FIG. 5. For example, the frequency regulation operation is performed first, and then the work operation is performed; or the work operation is performed first, and then the frequency regulation operation is performed, etc., and no limitation is made in this aspect.

As a variation of the embodiment shown in FIG. 5 or FIG. 6, an operation of measuring the frequency of the alternating current generated by each wind power generation unit may be added to the embodiment shown in FIG. 5 or FIG. 6.

Figure 7:
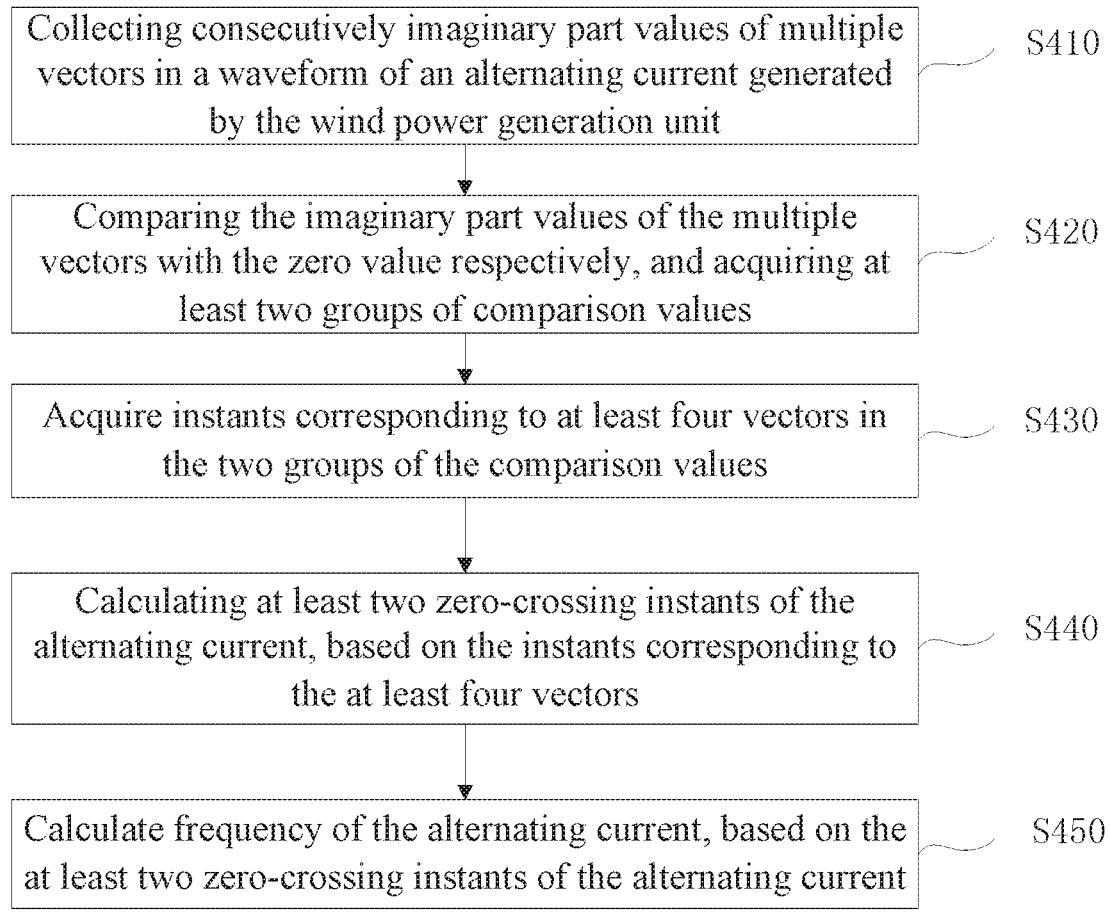
FIG. 7 is a flowchart of a process of measuring a frequency of an alternating current according to an embodiment of the present disclosure.

FIG. 7 is a flowchart of measuring a frequency of an alternating current according to an embodiment of the present disclosure. As shown in FIG. 7, the process of measuring the frequency of the alternating current includes steps S401 to S405.

In step S401, imaginary part values of multiple vectors in a waveform of an alternating current generated by the wind power generation unit are collected consecutively.

Figure 8:
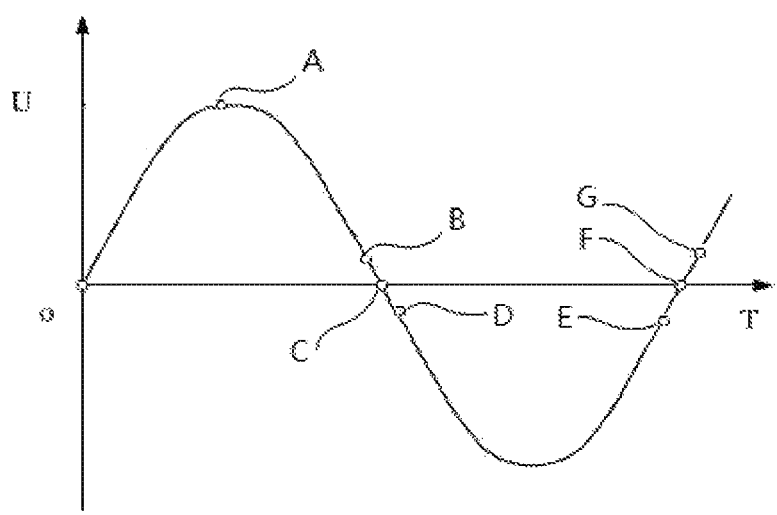
FIG. 8 is a schematic oscillogram of the alternating current shown in FIG. 7.

FIG. 8 is a schematic oscillogram of the above alternating current.

As shown in FIG. 8, the seven collected vectors are respectively A, B, C, D, E, F and G, where, for example, the imaginary part value of A is 220, the imaginary part value of B is 5, the imaginary part value of C is 0, the imaginary part value of D is −5, the imaginary part value of E is −6, the imaginary part value of F is 0, and the imaginary part value of G is 6.

In step S402, the imaginary part values of the multiple vectors are respectively compared with the zero value, to acquire at least two groups of comparison values, and the at least two groups of the comparison values each include two adjacent vectors for which the imaginary part value of one vector is positive, and the imaginary part value of the other vector is negative.

Specifically, the two groups of the comparison values may be comparison values of (B, D) and (E, G).

In step S403, instants corresponding to at least four vectors of the two groups of the comparison values are acquired.

Specifically, the instants corresponding to the four vectors may be instant T1 of B, instant T2 of D, instant T3 of E, and instant T4 of G.

In step S404, at least two zero-crossing instants of the alternating current are calculated based on the instants corresponding to the at least four vectors.

Specifically, the two zero-crossing instants may be zero-crossing instants of C and F.

In step S405, the frequency of the alternating current is calculated based on the at least two zero-crossing instants of the alternating current.

According to the embodiment, a signal can be quickly collected by the DSP calculation unit to precisely calculate voltage, current, power, and frequency. Specifically, the voltage and current collection method may be a method of directly performing a collection at a secondary side of a current transformer, to achieve quick collection and calculation. Collection data may be updated each 20 ms, so as to ensure timeliness of data of the whole system, and ensure a real-time control and the control precision.

With a software frequency measuring method, precision of frequency can reach 0.01 Hz, and when the wind farm is used in the secondary frequency regulation, the precision of the frequency regulation task can be ensured. Therefore, it can be seen that the method of frequency test by software can eliminate the influence of harmonics and direct current components, the calculated frequency values has a small dispersion and high precision, thereby ensuring the power quality of the wind farm.

The test and control methods according to above embodiments may also be applied to a virtual synchronous generator. Therefore, through above design, the entire power generation situation of the wind farm may be similar to that of the conventional thermal power generation unit, thereby meeting the national requirement for a grid using new energy and enabling the grid to operate stably with an increasing proportion of new energy.

In yet another embodiment, the processor card may be configured to measure the frequency of the alternating current generated by the work of the wind power generation unit. A specific measuring process includes: collecting consecutively imaginary part values of multiple vectors of a waveform of an alternating current generated by the work of the wind power generation unit; comparing the imaginary part values of the multiple vectors with the zero value respectively, and acquiring at least two groups of comparison values, where the at least two groups of the comparison values each include two adjacent vectors, for which the imaginary part value of one vector is positive, and the imaginary part value of the other vector is negative; acquitting instants corresponding to at least four vectors in the two groups of the comparison values; calculating at least two zero-crossing instants of the alternating current, based on the instants corresponding to the at least four vectors; and calculating the frequency of the alternating current, based on the at least two zero-crossing instants of the alternating current.

It should be noted that, the test and control apparatus in the foregoing embodiments may be used as an execution subject in the test and control methods according to the foregoing embodiments, which can achieve corresponding processing in each test and control method. Those skilled in the art may clearly understand that, for the specific working process of the foregoing hardware, such as a device, and a component, etc., reference may be made to a corresponding process in the foregoing method embodiments, and details are not described herein again.

The test and control apparatus according to above embodiments may also be applied to the virtual synchronous generator.

In the embodiments according to the present disclosure, it should be understood that the disclosed system, apparatus, and method may be implemented in other manners. For example, the apparatus embodiments described above are merely exemplary. For example, the unit division is merely logical function division and may be other division in actual implementation. For example, multiple units or components may be combined or can be integrated into another system, or some features can be omitted or not executed. In addition, the mutual coupling or direct coupling or communication connection shown or discussed may be indirect coupling or communication connection through some interfaces, and devices, and may also be electrical, mechanical or other forms of connection.

In addition, the hardware (for example, various calculators) in the embodiments of the present disclosure may be integrated in one processing unit, or each of the units may exist separately or physically, and two or more units may be integrated in one unit. The above integrated unit may be implemented in the form of hardware or in the form of software functional unit.

The foregoing descriptions are merely specific embodiments of the present disclosure, and the scope of the present disclosure is not limited thereto. Those skilled in the art may easily think of various equivalent modifications or replacements, and these modifications or replacements should fall within the scope of the present disclosure.

The invention claimed is:

1. A test and control apparatus for a wind farm, wherein the wind farm comprises a wind power generation unit, a first energy storage battery configured for each single wind power generation unit and arranged at a direct current bus side of the wind power generation unit, a second energy storage battery arranged in the wind farm, and a reactive compensation device, and the test and control apparatus comprises:

a first communication interface, a second communication interface, and a processor card, wherein the first communication interface is configured to connect a grid scheduling server, the second communication interface is configured to connect the wind power generation unit, and the processor card is connected to the first communication interface and the second communication interface respectively;

the processor card is configured to receive a frequency regulation instruction issued by the grid scheduling server via the first communication interface, receive operation information of the wind power generation unit via the second communication interface, and calculate a first frequency regulation capability of the wind power generation unit when the wind power generation unit performs frequency regulation without using the first energy storage battery based on the operation information of the wind power generation unit;

the processor card is configured to send the frequency regulation instruction to the wind power generation unit, in a case that the first frequency regulation capability of the wind power generation unit satisfies the frequency regulation instruction;

the processor card is further configured to calculate a second frequency regulation capability of the wind power generation unit when the wind power generation unit performs the frequency regulation using the first energy storage battery and determine whether the second frequency regulation capability satisfies a requirement of the frequency regulation instruction in a case that the first frequency regulation capability does not meet the requirement of the frequency regulation instruction; and the processor card is further configured to send the frequency regulation instruction to the wind power generation unit and start the first energy storage battery in a case that the second frequency regulation capability satisfies the requirement of the frequency regulation instruction, wherein in calculating the second frequency regulation capability of the wind power generation unit when the wind power generation unit performs the frequency regulation using the first energy storage battery and determining whether the second frequency regulation capability satisfies the requirement of the frequency regulation instruction in a case that the first frequency regulation capability does not meet the requirement of the frequency regulation instruction, the processor card is configured to:

calculate second frequency regulation capabilities of a plurality of wind power generation units each of which performs the frequency regulation using the first energy storage battery; and combine the calculated second frequency regulation capabilities of the plurality of wind power generation units each of which performs the frequency regulation using the first energy storage battery in a plurality of ways, to acquire a plurality of second combination frequency regulation capacities.

2. The test and control apparatus according to claim 1, wherein the processor card is configured to start the first energy storage battery and the second energy storage battery and send the frequency regulation instruction to the wind power generation unit, in a case that the second frequency regulation capability does not meet the requirement of the frequency regulation instruction.

3. The test and control apparatus according to claim 1, wherein the processor card is further configured to receive an active power demand instruction issued by the grid scheduling server via the first communication interface, and send the active power demand instruction to the wind power generation unit in a case that the first frequency regulation capability of the wind power generation unit satisfies a requirement of the active power demand instruction.

4. The test and control apparatus according to claim 3, further comprising:

a third communication interface respectively connected to the processor card and the reactive compensation device, wherein the processor card is further configured to receive an reactive power demand instruction from the grid scheduling server via the first communication interface, receive operation information of the reactive compensation device via the third communication interface, calculate capability information of the reactive compensation device based on the operation information of the reactive compensation device, and send the reactive power demand instruction to the reactive compensation device in a case that the capability information of the reactive compensation device satisfies a requirement of the reactive power demand instruction.

5. The test and control apparatus according to claim 4, further comprising an alternating current analog quantity card connected to the processor card, wherein the alternating current analog quantity card is configured to collect voltage and current information at a high voltage side and a low voltage side of a main transformer of the wind farm, and send the collected voltage and current information to the processor card.

6. The test and control apparatus according to claim 5, further comprising a direct current analog quantity card connected to the processor card, wherein the direct current analog quantity card is configured to collect direct current analog quantity information of the wind power generation unit, the first and second energy storage batteries or the reactive compensation device in the wind farm, and send the collected direct current analog quantity information to the processor card.

7. The test and control apparatus according to claim 6, further comprising a switch-in card connected to the processor card, wherein the switch-in card is configured to collect switch state information of the wind power generation unit, the first and second energy storage-batteries or the reactive compensation device in the wind farm, and send the collected switch state information to the processor card.

8. The test and control apparatus according to claim 7, further comprising a switch-out card connected to the processor card, wherein the switch-out card is configured to receive a switch-out signal of the processor card, and send switch-out information to the wind power generation unit, the first and second energy storage batteries or the reactive compensation device in the wind farm.

9. The test and control apparatus according to claim 8, wherein the processor card comprises an advanced RISC machines (ARM) module and a digital signal processing (DSP) module, wherein RISC is reduced instruction set computer;

the ARM module is connected to the first communication interface, the second communication interface and the DSP module;

the DSP module is connected to the third communication interface, the alternating current analog quantity card, the direct current analog quantity card, the switch-in card and the switch-out card;

the ARM module is connected with the DSP module via a communication bus;

the ARM module is configured to exchange information with the grid scheduling server, the wind power generation unit, the reactive compensation device, and the DSP module, and send the frequency regulation instruction, the active power demand instruction, the reactive power demand instruction, and an instruction for starting the first energy storage battery and the second energy storage battery; and the DSP module is configured to issue a switch-out instruction to the wind power generation unit, the reactive compensation device, the first energy storage battery, and the second energy storage battery, based on the frequency regulation instruction, the active power demand instruction, the reactive power demand instruction, and the instruction for starting the first energy storage battery and the second energy storage battery.

10. A test and control system for a wind farm, comprising a test and control apparatus for a wind farm, wherein the wind farm comprises a wind power generation unit, a first energy storage battery configured for each single wind power generation unit and arranged at a direct current bus side of the wind power generation unit, a second energy storage battery arranged in the wind farm, and a reactive compensation device, and the test and control apparatus comprises:

a first communication interface, a second communication interface, and a processor card, wherein the first communication interface is configured to connect a grid scheduling server, the second communication interface is configured to connect the wind power generation unit, and the processor card is connected to the first communication interface and the second communication interface respectively;

the processor card is configured to receive a frequency regulation instruction issued by the grid scheduling server via the first communication interface, receive operation information of the wind power generation unit via the second communication interface, and calculate a first frequency regulation capability of the wind power generation unit when the wind power generation unit performs frequency regulation without using the first energy storage battery based on the operation information of the wind power generation unit;

the processor card is configured to send the frequency regulation instruction to the wind power generation unit, in a case that the first frequency regulation capability of the wind power generation unit satisfies the frequency regulation instruction;

the processor card is further configured to calculate a second frequency regulation capability of the wind power generation unit when the wind power generation unit performs the frequency regulation using the first energy storage battery and determine whether the second frequency regulation capability satisfies a requirement of the frequency regulation instruction in a case that the first frequency regulation capability does not meet the requirement of the frequency regulation instruction; and the processor card is further configured to send the frequency regulation instruction to the wind power generation unit and start the first energy storage battery in a case that the second frequency regulation capability satisfies the requirement of the frequency regulation instruction, wherein in calculating the second frequency regulation capability of the wind power generation unit when the wind power generation unit performs the frequency regulation using the first energy storage battery and determining whether the second frequency regulation capability satisfies the requirement of the frequency regulation instruction in a case that the first frequency regulation capability does not meet the requirement of the frequency regulation instruction, the processor card is configured to:

calculate second frequency regulation capabilities of a plurality of wind power generation units each of which performs the frequency regulation using the first energy storage battery; and combine the calculated second frequency regulation capabilities of the plurality of wind power generation units each of which performs the frequency regulation using the first energy storage battery in a plurality of ways, to acquire a plurality of second combination frequency regulation capacities.

11. A test and control method for a wind farm, wherein the wind farm comprises a wind power generation unit, a first energy storage battery configured for each single wind power generation unit and arranged at a direct current bus side of the wind power generation unit, a second energy storage battery arranged in the wind farm, and a reactive compensation device; and the method comprises:

receiving a frequency regulation instruction;

receiving current wind speed information of the wind power generation unit;

calculating a first frequency regulation capability of the wind power generation unit when the wind power generation unit performs a frequency regulation without using the first energy storage battery based on the current wind speed information, and determining whether the first frequency regulation capability satisfies a requirement of the frequency regulation instruction;

sending the frequency regulation instruction to the wind power generation unit, in a case that the first frequency regulation capability satisfies the requirement of the frequency regulation instruction;

calculating a second frequency regulation capability of the wind power generation unit when the wind power generation unit performs the frequency regulation using the first energy storage battery and determining whether the second frequency regulation capability satisfies the requirement of the frequency regulation instruction in a case that the first frequency regulation capability does not meet the requirement of the frequency regulation instruction; and sending the frequency regulation instruction to the wind power generation unit and starting the first energy storage battery in a case that the second frequency regulation capability satisfies the requirement of the frequency regulation instruction, wherein calculating the second frequency regulation capability of the wind power generation unit when the wind power generation unit performs the frequency regulation using the first energy storage battery and determining whether the second frequency regulation capability satisfies the requirement of the frequency regulation instruction in a case that the first frequency regulation capability does not meet the requirement of the frequency regulation instruction comprises:

calculating second frequency regulation capabilities of a plurality of wind power generation units each of which performs the frequency regulation using the first energy storage battery; and combining the calculated second frequency regulation capabilities of the plurality of wind power generation units each of which performs the frequency regulation using the first energy storage battery in a plurality of ways, to acquire a plurality of second combination frequency regulation capacities.

12. The test and control method according to claim 11, further comprising:

starting the first energy storage battery and the second energy storage battery and sending the frequency regulation instruction to the wind power generation unit, in a case that the second frequency regulation capability does not meet the requirement of the frequency regulation instruction.

13. The test and control method according to claim 11, further comprising:

receiving a power demand instruction, wherein the power demand instruction comprises an active power demand instruction and a reactive power demand instruction;

calculating a work capability value of each wind power generation unit based on the current wind speed information; and calculating an active power and/or a reactive power required to be generated by each wind power generation unit based on the power demand instruction and the work capability value of each wind power generation unit, and sending an instruction for work based on the required active power and/or reactive power to each wind power generation unit.

14. The test and control method according to claim 13, further comprising:
collecting consecutively imaginary part values of a plurality of vectors in a waveform of an alternating current generated by the wind power generation unit;
comparing the imaginary part values of the plurality of vectors with the zero value respectively, and acquiring at least two groups of comparison values, wherein each of the at least two groups of the comparison values comprises two adjacent vectors, for which the imaginary part value of one vector is positive, and the imaginary part value of the other vector is negative;
acquiring instants corresponding to at least four vectors in the two groups of the comparison values;
calculating at least two zero-crossing instants of the alternating current, based on the instants corresponding to the at least four vectors; and
calculating a frequency of the alternating current, based on the at least two zero-crossing instants of the alternating current.

15. The test and control method according to claim 14, wherein the method is applied to a virtual synchronous generator.

16. The test and control method according to claim 11, further comprising:
receiving a power demand instruction, wherein the power demand instruction comprises an active power demand instruction and a reactive power demand instruction;
calculating a work capability value of each wind power generation unit based on the current wind speed information; and
calculating an active power and/or a reactive power required to be generated by each wind power generation unit based on the power demand instruction and the work capability value of each wind power generation unit, and sending an instruction for work based on the required active power and/or reactive power to each wind power generation unit.

17. The test and control method according to claim 12, further comprising:
receiving a power demand instruction, wherein the power demand instruction comprises an active power demand instruction and a reactive power demand instruction;
calculating a work capability value of each wind power generation unit based on the current wind speed information; and
calculating an active power and/or a reactive power required to be generated by each wind power generation unit based on the power demand instruction and the work capability value of each wind power generation unit, and sending an instruction for work based on the required active power and/or reactive power to each wind power generation unit.

* * * * *

UNITED STATES PATENT AND TRADEMARK OFFICE
CERTIFICATE OF CORRECTION

PATENT NO. : 11,581,731 B2
APPLICATION NO. : 15/778916
DATED : February 14, 2023
INVENTOR(S) : Nan Ye et al.

It is certified that error appears in the above-identified patent and that said Letters Patent is hereby corrected as shown below:

In the Claims

Claim 4, Column 10, Lines 53-54, "an reactive power demand instruction" should read --a reactive power demand instruction--.

Claim 9, Column 18, Lines 33-34, "an advanced RISC machines (ARM) module" should read --an advanced RISC machine (ARM) module--.

Claim 9, Column 18, Line 36, "RISC is reduced instruction set computer" should read --RISC is a reduced instruction set computer--.

Signed and Sealed this
First Day of August, 2023

Katherine Kelly Vidal
*Director of the United States Patent and Trademark Office*